US011057816B2

(12) United States Patent
Mazzarese et al.

(10) Patent No.: US 11,057,816 B2
(45) Date of Patent: *Jul. 6, 2021

(54) SYSTEM AND METHOD FOR INTERFERENCE MANAGEMENT IN CELLULAR NETWORKS

(71) Applicant: Futurewei Technologies, Inc., Plano, TX (US)

(72) Inventors: David Jean-Marie Mazzarese, Beijing (CN); Qiang Li, Shenzhen (CN); Zheng Yu, Beijing (CN); Weimin Xiao, Hoffman Estates, IL (US); Brian Classon, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,563

(22) Filed: May 20, 2020

(65) Prior Publication Data
US 2020/0280897 A1    Sep. 3, 2020

Related U.S. Application Data

(63) Continuation of application No. 16/241,675, filed on Jan. 7, 2019, now Pat. No. 10,701,607, which is a
(Continued)

(51) Int. Cl.
*H04W 36/20* (2009.01)
*H04L 5/00* (2006.01)
(Continued)

(52) U.S. Cl.
CPC ............ *H04W 36/20* (2013.01); *H04H 20/57* (2013.01); *H04L 5/005* (2013.01); *H04L 5/0023* (2013.01);
(Continued)

(58) Field of Classification Search
None
See application file for complete search history.

(56) References Cited

U.S. PATENT DOCUMENTS 8,218,663 B2    7/2012    Muharemovic et al.
8,755,807 B2    6/2014    Gorokhov et al.
(Continued)

FOREIGN PATENT DOCUMENTS

WO    2011100672 A1    8/2011
WO    2011122833 A2    10/2011

OTHER PUBLICATIONS

LTE, 3rd Generation Partnership Project; Technical Specification Group Radio Access Network; Evolved Universal Terrestrial Radio Access (E-UTRA); Physical Channels and Modulation (Release 11), 3GPP TS 36.211 v11.6.0, Sep. 2014, 120 pages.
(Continued)

*Primary Examiner* — Diane L Lo
(74) *Attorney, Agent, or Firm* — Slater Matsil, LLP (57) ABSTRACT

Notifying served user equipments (UEs) of the presence or absence of cell-specific reference signal (CRS) symbols transmitted by neighboring base stations in the physical downlink shared channel (PDSCH) region of a subframe can be achieved through various of signaling techniques. The served UE may be notified by communicating a one or multi-bit indicator in a physical layer signaling channel of the serving cell, such as the physical downlink control channel (PDCCH) of the subframe. Alternatively, the served UE may be notified through higher layer signaling.

18 Claims, 6 Drawing Sheets

Related U.S. Application Data continuation of application No. 15/013,666, filed on Feb. 2, 2016, now Pat. No. 10,194,365, which is a continuation of application No. 13/670,964, filed on Nov. 7, 2012, now Pat. No. 9,276,709.

(60) Provisional application No. 61/557,323, filed on Nov. 8, 2011.

(51) Int. Cl.
| | | |
|---|---|---|
| *H04H 20/57* | (2008.01) | |
| *H04W 24/02* | (2009.01) | |
| *H04W 72/04* | (2009.01) | |
| *H04W 88/02* | (2009.01) | |
| *H04W 88/12* | (2009.01) | |

(52) U.S. Cl.
CPC .......... *H04L 5/0048* (2013.01); *H04L 5/0053* (2013.01); *H04W 24/02* (2013.01); *H04W 72/042* (2013.01); *H04W 88/02* (2013.01); *H04W 88/12* (2013.01)

(56) References Cited

U.S. PATENT DOCUMENTS

| | | | |
|---|---|---|---|
| 8,761,087 | B2 | 6/2014 | Nam et al. |
| 8,811,280 | B2 | 8/2014 | Kim et al. |
| 8,830,928 | B2 | 9/2014 | Iwamura et al. |
| 9,276,709 | B2 | 3/2016 | Mazzarese et al. |
| 10,701,607 | B2 * | 6/2020 | Mazzarese .............. H04L 5/005 |
| 2004/0001429 | A1 | 1/2004 | Ma et al. |
| 2006/0007850 | A1 | 1/2006 | Park et al. |
| 2009/0067522 | A1 | 3/2009 | Kwak et al. |
| 2009/0110114 | A1 | 4/2009 | Onggosanusi et al. |
| 2009/0252077 | A1 | 10/2009 | Khandekar et al. |
| 2010/0034312 | A1 | 2/2010 | Muharemovic et al. |
| 2010/0046412 | A1 | 2/2010 | Varadarajan et al. |
| 2010/0046494 | A1 | 2/2010 | Palanki et al. |
| 2010/0056197 | A1 | 3/2010 | Attar et al. |
| 2010/0061360 | A1 | 3/2010 | Chen et al. |
| 2010/0062783 | A1 | 3/2010 | Luo et al. |
| 2010/0177746 | A1 | 7/2010 | Gorokhov et al. |
| 2010/0273506 | A1 | 10/2010 | Stern-Berkowitz et al. |
| 2010/0303034 | A1 | 12/2010 | Chen et al. |
| 2011/0235601 | A1 | 9/2011 | Yoo et al. |
| 2011/0243009 | A1 | 10/2011 | Chandrasekhar et al. |
| 2011/0249620 | A1 | 10/2011 | Yu et al. |
| 2011/0261736 | A1 | 10/2011 | Stewart et al. |
| 2011/0267997 | A1 | 11/2011 | Seo et al. |
| 2012/0046033 | A1 | 2/2012 | Ko et al. |
| 2012/0113795 | A1 | 5/2012 | Ko et al. |
| 2012/0113884 | A1 | 5/2012 | Park et al. |
| 2012/0120863 | A1 | 5/2012 | Gou et al. |
| 2012/0140726 | A1 | 6/2012 | Moon et al. |
| 2012/0264441 | A1 | 10/2012 | Chandrasekhar et al. |
| 2012/0281636 | A1 | 11/2012 | Xiao et al. |
| 2013/0188531 | A1 | 7/2013 | Zhang |
| 2013/0286694 | A1 | 10/2013 | Shi |
| 2014/0064135 | A1 | 3/2014 | Chen |
| 2014/0204807 | A1 | 7/2014 | Li |
| 2015/0236828 | A1 | 8/2015 | Park |
| 2015/0257130 | A1 | 9/2015 | Lee |
| 2016/0192415 | A1 | 6/2016 | Davydov et al. |

OTHER PUBLICATIONS

LTE, 3rd Generation Partnership Project; Technical Specification Group Radio Access Network; Evolved Universal Terrestrial Radio Access (E-UTRA); Multiplexing and Channel Coding (Release 11), 3GPP TS 36.212 v11.5.1, Sep. 2014, 84 pages.

LTE, 3rd Generation Partnership Project; Technical Specification Group Radio Access Network; Evolved Universal Terrestrial Radio Access (E-UTRA); Physical Layer Procedures (Release 11); 3GPP TS 36.213 v11.9.0, Dec. 2014, 182 pages.

LTE, 3rd Generation Partnership Project; Technical Specification Group Radio Access Network; Evolved Universal Terrestrial Radio Access (E-UTRA); Radio Resource Control (RRC); Protocol Specification (Release 11), 3GPP TS 36.331 v11.10.0, Dec. 2014, 356 pages.

3rd Generation Partnership Project; Technical Specification Group Radio Access Network; Evolved Universal Terrestrial Radio Access (E-UTRA); Physical Channels and Modulation (Release 10), 3GPP TS 36.211 v10.3.0 (Sep. 2011), 103 pages.

3rd Generation Partnership Project; Technical Specification Group Radio Access Network; Evolved Universal Terrestrial Radio Access (E-UTRA); Physical layer procedures (Release 10), 3GPP TS 36.213 v10.3.0 (Sep. 2011), 122 pages.

3rd Generation Partnership Project; Technical Specification Group Radio Access Network; Evolved Universal Terrestrial Radio Access (E-UTRA); Radio Resource Control (RRC); Protocol specification (Release 8), 3GPP TS 36.331 v8.15.0 (Sep. 2011), 213 pages.

Huawei, HiSilicon, "Tx-based solution for further evaluation," R1-112895, 3GPP TSG RAN WG1 Meeting #66bis, Zhuhai, China, Oct. 10-14, 2011, 3 pages.

LG Electronics, "Considerations on PBCH and PSS/SSS for FeICIC," R1-113272, 3GPP TSG RAN WG1 Meeting #66bis, Zhuhai, China, Oct. 10-14, 2011, 3 pages.

"LS on feICIC," 3GPP TSG-RAN1#67, R1-114468, Release 11, San Francisco, CA, Nov. 14-18, 2011, 1 page.

Mitayani, A., "Reference Signal for LTE-Advanced", Fusi, PT. Fusi GLobal Teknologi, 27 Pages.

NTT Docomo, "Views on eICIC Schemes for Rel-10," R1-105442, 3GPP TSG RAN WG1 Meeting #62bis, Xian, China, Oct. 11-15, 2010, 9 pages.

Qualcomm Incorporated, "Enabling communication in harsh interference scenarios," R1-104818, 3GPP TSG-RAN WG1 #62, Aug. 23-27, 2010, Madrid Spain, 11 pages.

Samsung, "CRS Interference Cancellation in HetNet Scenarios for UE Performance Requirements," 3GPP TSG RAN WG1 Meeting #66, R1-112507, Athens, Greece, Aug. 22-26, 2011, 3 pages.

NTT Docomo, "Investigation of Specification Impact for Rel. 11 CoMP," 3GPP TSG RAN WG1 Meeting #66, R1-112600, Athens, Greece, Aug. 22-26, 2011, 5 pages.

ETRI, "Downlink Control Signaling for Downlink CoMP," 3GPP TSF RAN WG1 Meeting #66bis, R1-113555, Zhuhai, China, Oct. 10-14, 2011, 3 pages.

ETRI, "PDSCH Mapping/CRS Pattern Indication for Multi-Cell JP CoMp," 3GPP TSG RAN WG1 Meeting #67, R1-113956, San Francisco, USA, Nov. 14-18, 2011, 4 pages.

Rohde & Schwarz, LTE Relase 9 Technology Introduction White Paper, published Dec. 2011, pp. 7-11 & 25-27.

Schmidt, LTE: Mobilfunk der Zukunft Broadcast Operation, Seminar Auesgewahite Kapitel der Nachrichtentechnik, WS 2009/2010, Jan. 27, 2010, pp. 1-15 (http://www.lmk.Int.de/fileadmin/Lehre/Seminar09/Ausarbeitungen/Ausarbeitung_Schmidt.pdf).

Texas Instruments, "Transmit-side Signalling Enhancements Targeting Het-Nets for Rel-11," R1-113244, 3GPP TSG RAN WG1 Meeting #66bis, Zhuhzai, China, Oct. 10-14, 2011, 7 pages.

* cited by examiner

SYSTEM AND METHOD FOR INTERFERENCE MANAGEMENT IN CELLULAR NETWORKS

This application is a continuation of U.S. patent application Ser. No. 16/241,675 filed on Jan. 7, 2019 and entitled "System and Method for Interference Management in Cellular Networks", which is a continuation of U.S. patent application Ser. No. 15/013,666 filed on Feb. 2, 2016 and entitled "System and Method for Interference Management in Cellular Networks," (now U.S. Pat. No. 10,194,365, issued Jan. 29, 2019), which is a continuation of U.S. patent application Ser. No. 13/670,964 filed on Nov. 7, 2012 (now U.S. Pat. No. 9,276,709, issued Mar. 1, 2016), entitled "System and Method for Interference Management in Cellular Networks," which claims priority to U.S. Provisional Application No. 61/557,323 filed on Nov. 8, 2011, entitled "System and Method for Interference Management in Cellular Networks," all of which applications are hereby incorporated by reference herein as if reproduced in their entireties.

TECHNICAL FIELD

The present disclosure relates to wireless communications, and, in particular embodiments, to systems and methods for interference management in cellular networks.

BACKGROUND

In Third Generation Partnership Project (3GPP) Long Term Evolution (LTE) networks, cell-specific reference signal (CRS) symbols are included in downlink subframes to provide channel estimation for demodulation and downlink channel quality measurement. The number and location of the CRS symbols within a given subframe or resource block (RB) varies depending on the transmission mode of the signal, and more specifically, on the number of CRS antenna ports (e.g., one, two, or four) used to perform the data transmission. While user equipments (UEs) are typically aware of the location/presence of CRS symbols transmitted by their respective serving cells, they are not aware of the location and/or presence of CRS symbols transmitted by neighboring cells. Even so, UEs may benefit from knowledge related to CRS symbols transmitted by neighboring cells. As such, mechanisms and techniques for notifying UEs of the location of CRS symbols in downlink transmissions of neighboring cells are desired to improve wireless performance in the network.

SUMMARY OF THE INVENTION

Technical advantages are generally achieved, by embodiments of the present disclosure which describe systems and methods for interference management in cellular networks.

In accordance with an embodiment, a method for operating a network controller is provided. In this example, the method includes transmitting an indicator to a served user equipment (UE) specifying whether cell-specific reference signal (CRS) symbols transmitted by a interfering network controller are present in a physical downlink shared channel (PDSCH) region of a subframe. An apparatus for performing this method is also provided.

In accordance with another embodiment, a method for operating a user equipment (UE) is provided. In this example, the method includes receiving an indicator from a first network controller that specifies whether cell-specific reference signal (CRS) symbols transmitted by a second network controller are included in a physical downlink shared channel (PDSCH) region of a subframe. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the disclosed embodiments and are not necessarily drawn to scale.

DETAILED DESCRIPTION OF ILLUSTRATIVE EMBODIMENTS

The making and using of the presently disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use embodiments of this disclosure, and do not limit the scope of this disclosure.

Knowledge relating to CRS symbols transmitted by neighboring cells is beneficial for served UEs receiving cooperative transmissions as well as non-cooperative transmissions. One technique for communicating CRS parameters of neighboring cell(s) to a served UE is to communicate the number of CRS antenna ports (e.g., one, two, or four) and the frequency shifts of the neighboring cell to the UE. However, this technique ignores the possibility that CRS symbols of a neighboring cell are excluded from the PDSCH region of a downlink subframe, as might be the case when the downlink subframe is a Multicast-Broadcast Single Frequency Network (MBSFN) subframe. Notably, knowledge relating to the presence or absence of CRS symbols transmitted by neighboring cells in the PDSCH region of a downlink subframe may allow a served UE to more accurately demodulate a cooperative transmission and/ or better perform interference cancellation when demodulating a non-cooperative transmission. As such, techniques and mechanisms for notifying served UEs of the presence or absence of CRS symbols transmitted by neighboring cells in the PDSCH region of a downlink subframe are desired.

Aspects of this disclosure provide various mechanisms for indicating when CRS symbols transmitted by neighboring cells are absent from the PDSCH region of a downlink subframe, as may be the case when the subframe is an MBSFN subframe. The indication may be performed by communicating a bitmap or field value specifying that zero CRS antenna ports are associated with a transmission of a neighboring cell when CRS symbols associated with that transmission are absent from the PDSCH region of the corresponding subframe. In some embodiments, the indication (e.g., bitmap, field value, etc.) may be communicated semi-statically via higher layer signaling (e.g., radio resource connectivity (RRC) signaling, etc.). In other embodiments, the indication (e.g., bitmap, field value, etc.) may be communicated dynamically via a physical downlink control channel (PDCCH) region of the downlink subframe. In yet other embodiments, CRS parameters (e.g., number of CRS antenna ports, CRS frequency shift, etc.) may be communicated semi-statically via higher layer signaling (e.g., RRC signaling, etc.), while an indicator (one bit or multi-bit) may be included in the PDCCH region of the subframe to indicate whether CRS symbols transmitted by a neighboring cell are present in the PDSCH region of the subframe.

As discussed herein, cooperative transmissions may include any transmission originating from two or more transmission points, including multipoint (CoMP) joint transmission (JT), CoMP dynamic cell selection (DCS), CoMP dynamic point selection (DPS), and others. Further and as discussed herein, non-cooperative transmission may generally include any transmission originating from a single transmit point (TP).

Figure 1:
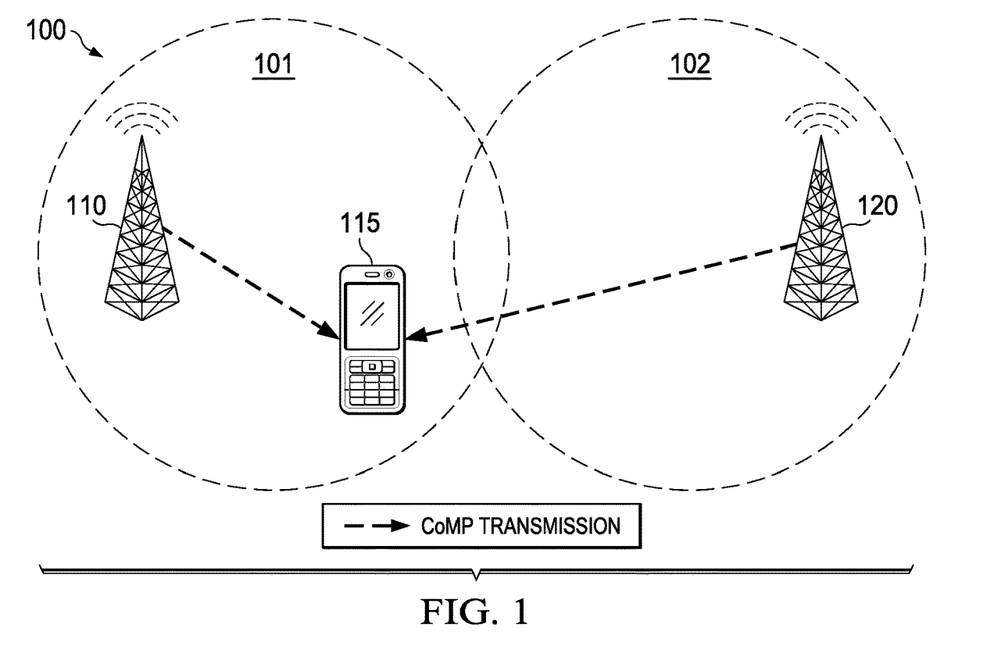
FIG. 1 illustrates a diagram of an embodiment of a wireless communications network.

As mentioned above, UEs receiving cooperative transmissions (e.g., transmissions originating from multiple TPs) may benefit from knowing the CRS parameters of neighboring cells. FIG. 1 illustrates a wireless network 100 comprising a plurality enhanced base stations (eNBs) 110, 120 configured for cooperative transmission. The eNBs 110, 120 may be any wireless device configured to provide wireless access in cellular coverage areas (cells) 101, 102, and may be commonly referred to as NodeBs, base stations, communications controllers, controllers, femtocells, home base stations, etc. The network may further include a UE 115 configured to receive the coordinated transmission. The UE 115 may be any wirelessly enabled device configured to receive wireless transmissions, and may be commonly referred to as a mobile station, subscriber, terminal, user, etc. In some embodiments, the wireless network 100 may include other wireless devices (not shown), including relays, femtocells, picocells, etc.

In embodiments, the UE 115 may benefit from knowledge relating to the CRS parameters of the cell 102. Such knowledge may include not only the positioning of CRS symbols communicated by the eNB 120 within a given subframe, but also the presence or absence of CRS symbols within one or more regions of that subframe. For instance, knowing that CRS symbols communicated by the eNB 120 are excluded from the PDSCH region of a subframe may enhance the ability of the UE 115 to demodulate a coordinated transmission performed jointly by the eNBs 110 and 120.

Figure 2:
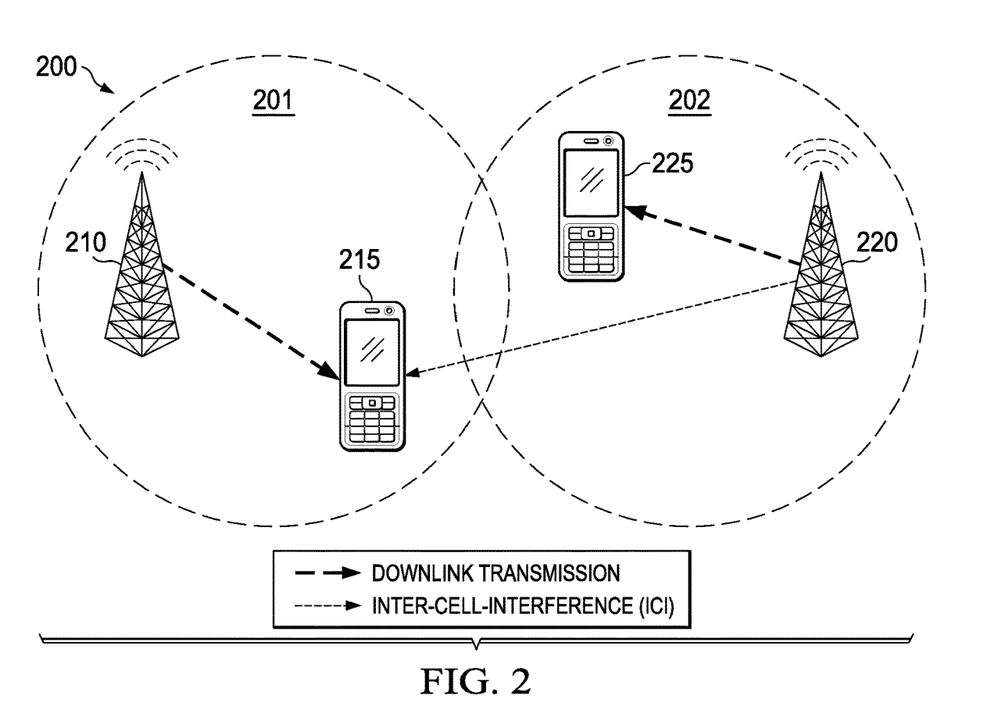
FIG. 2 illustrates a diagram of another embodiment of a wireless communications network.

Further and as mentioned above, UEs receiving non-cooperative transmissions (e.g., transmission originating from a single TP) may benefit from knowing the CRS parameters of neighboring cells. FIG. 2 illustrates a wireless network 200 comprising a plurality of cellular coverage areas (cells) 201, 202, within which wireless access is provided by a plurality eNBs 210, 220 (respectively). During the course of providing wireless access, the eNBs 210, 220 may schedule the UEs 215, 225 to receive downlink transmissions (dashed lines) in a common time-frequency resource (e.g., the same RB). The downlink transmission originating from the eNB 220 may interfere with the downlink transmission originating from the eNB 210, thereby producing ICI in the cell 201. In some embodiments, the UE 215 may employ an interference cancellation technique to mitigate the effects of this interference. For instance, the UE 215 may utilize an enhanced inter-cell interference cancellation (eICIC) technique to isolate downstream transmissions originating from the eNB 210 (e.g., the serving data) from downlink transmissions originating from the eNB 220 (e.g., the interfering data). In embodiments, the UE 215 may benefit from knowledge relating to the CRS parameters of the cell 202. For instance, knowing that CRS symbols communicated by the eNB 220 are excluded from the PDSCH region of a subframe may improve the UE's 215 ability to isolate the serving data transmission through interference cancellation. Although the FIGS. 1-2 depict networks comprising a single neighboring cell, aspects of this disclosure can be adapted to cooperative and non-cooperative communications involving any number of neighboring cells (e.g., three or more neighboring cells).

Figure 3:
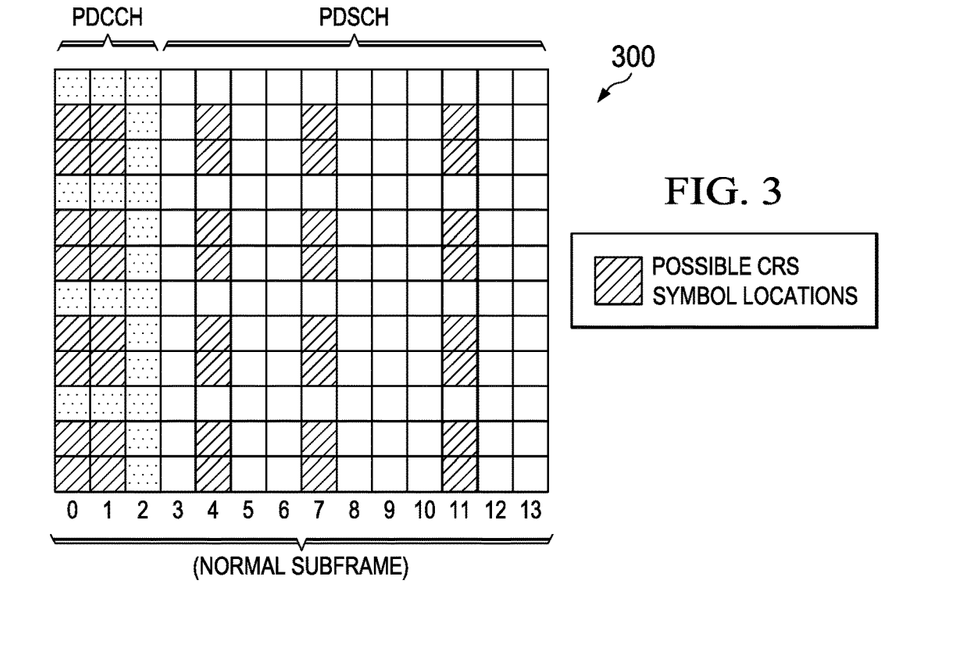
FIG. 3 illustrates a diagram of a normal subframe.

FIG. 3 illustrates a diagram of a normal subframe 300, as might carry data transmission by one or both of the eNBs 120, 220. As shown, the normal subframe 300 comprises a plurality of possible CRS symbol locations in the PDCCH and PDSCH regions of the normal subframe 300. Notably, the actual location of CRS symbols within the normal subframe 300 will depend on the CRS port and CRS frequency shift associated with the data transmission. However, regardless of which CRS port and CRS frequency shift are associated with the normal subframe 300, at least some CRS symbols will be present in the PDSCH region of the normal subframe 300.

Figure 4:
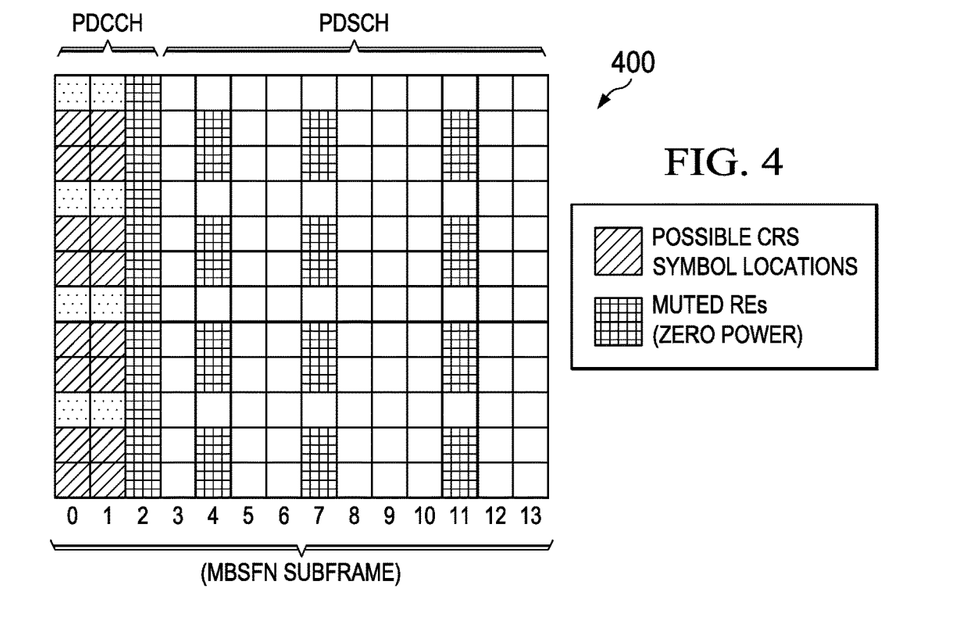
FIG. 4 illustrates a diagram of an MBSFN subframe.

FIG. 4 illustrates a diagram of an MBSFN subframe 400, as might carry data transmission by one or both of the eNBs 120, 220. Unlike the normal subframe 300, CRS symbols are excluded from the PDSCH region of the MBSFN subframe 400. The PDSCH region of the MBSFN subframe 400 may be referred to as 'MBSFN region', while the PDCCH region of the MBSFN subframe 400 may be referred to as the 'non-MBSFN region. More specifically, REs that would otherwise carry CRS symbols in the PDSCH region of the MBSFN subframe 400 are muted (e.g., are zero power REs). Hence, while the various CRS port and CRS frequency shift combinations associated with the normal subframe 300 may also be associated with the MBSFN subframe 400, resulting CRS symbols positioned in the PDSCH region of the MBSFN subframe 400 are muted (e.g., not transmitted). Accordingly, served UEs that are not aware that the subframe is an MBSFN type subframe may mistakenly believe that one or more of the muted resource elements (Res) in the PDSCH region of the MBSFN subframe 400 carry CRS symbols transmitted by neighboring cells.

Figure 5:
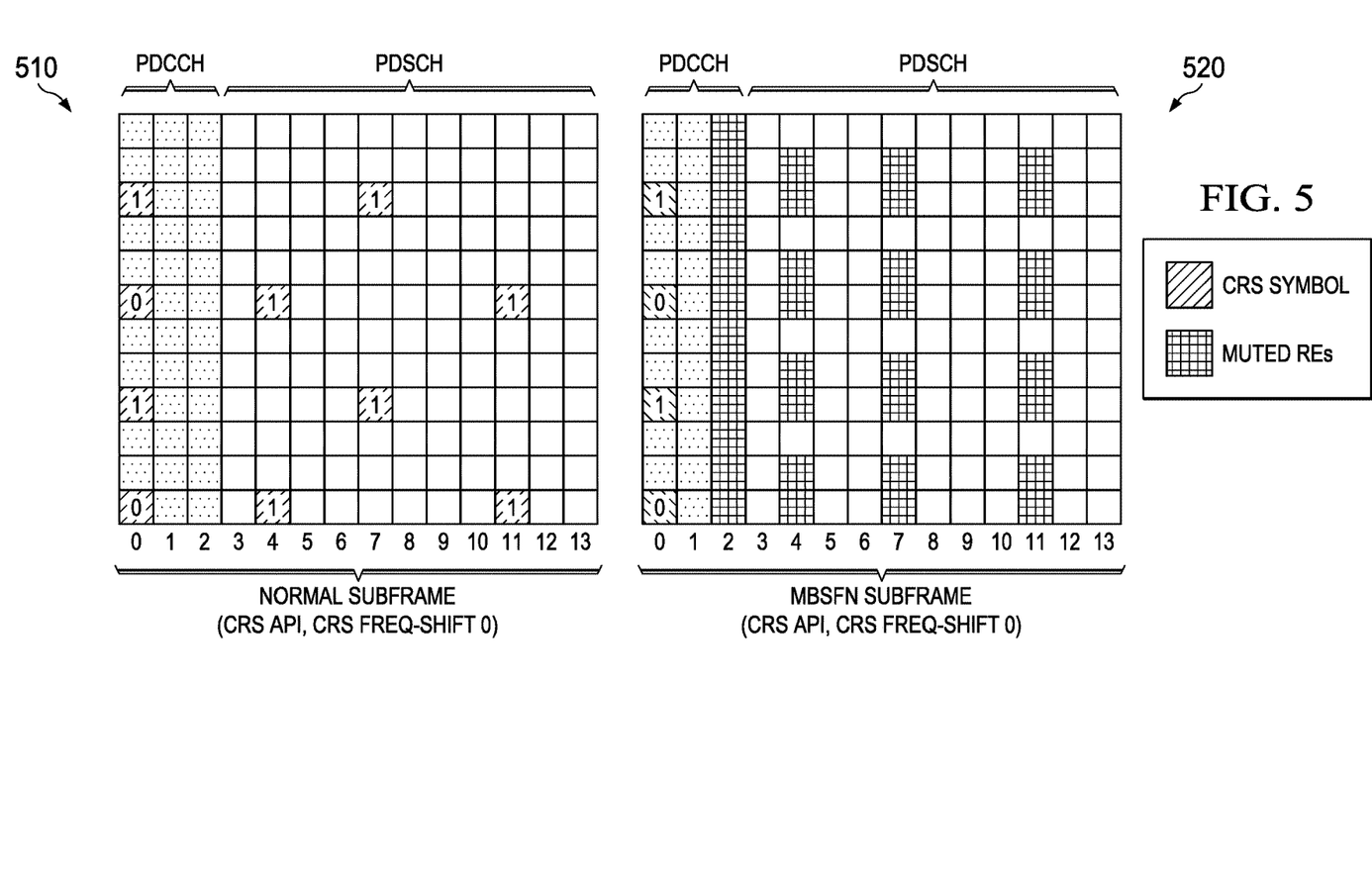
FIG. 5 illustrates a diagram of an embodiment of a normal subframe and an Multicast-Broadcast Single Frequency Network (MBSFN) subframe communicated in accordance with the same CRS parameters.

As an example, FIG. 5 illustrates a normal subframe 510 and an MBSFN subframe 520 that are communicated in accordance with identical CRS parameters, namely a CRS antenna port (AP) one and CRS frequency shift value of zero. As shown, the PDSCH region of the normal subframe 510 carries CRS symbols in the timeslots four, seven, and eleven. However, those corresponding timeslots in the PDSCH region of the MBSFN subframe 520 are muted. As such, a served UE that knows CRS parameters of a neighboring cell, but is otherwise unaware that the subframe is an MBSFN subframe 520 rather than the normal subframe 510, may mistakenly believe that CRS symbols are carried in one or more of muted REs of the MBSFN subframe 520.

Figure 6:
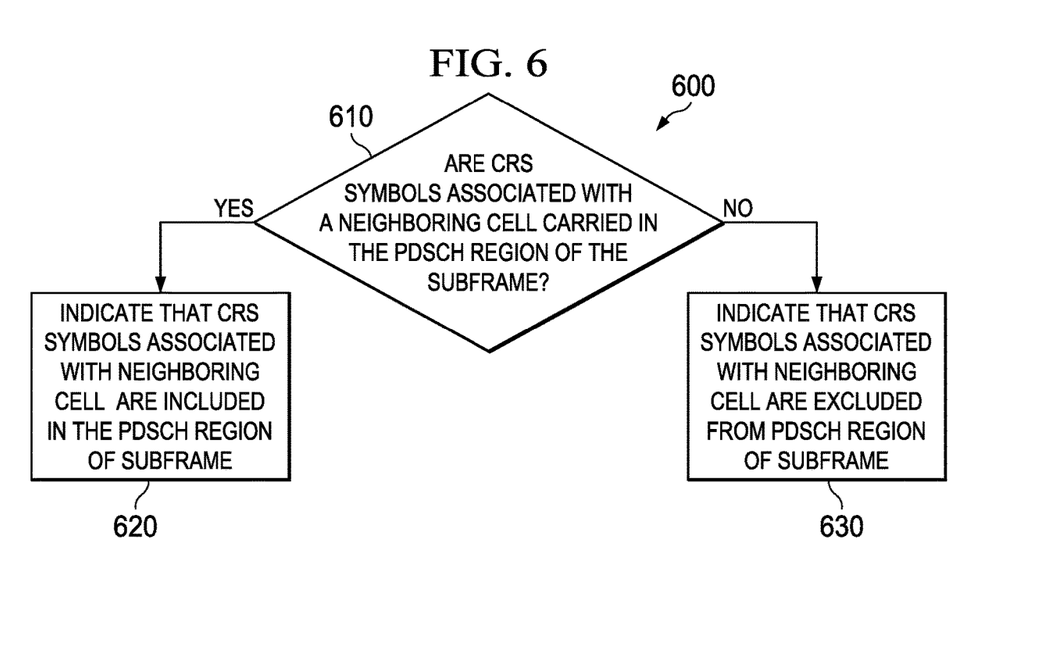
FIG. 6 illustrates a flow chart of a method for indicating the presence or absence of CRS symbols in the PDSCH region of a subframe communicated by a neighboring cell.

FIG. 6 illustrates a method 600 for indicating when CRS symbols of a neighboring cell are present in or absent from a PDSCH region of a subframe, as might be performed by a serving eNB. The method 600 begins at step 610, where the serving eNB determines whether CRS symbols associated with a neighboring cell are carried in the PDSCH region of the subframe. If so, the method 600 proceeds to step 620, where the eNB indicates that CRS symbols associated with the neighboring cell are included in PDSCH region of the subframe. If CRS symbols associated with a neighboring cell are excluded from (or otherwise not carried in) the PDSCH region of the subframe, the method 600 proceeds to step 630, where the eNB indicates that CRS symbols associated with the neighboring cell are excluded from the PDSCH region of the subframe. In some embodiments, the indications made in steps 620 and 630 may include setting or clearing an indicator bit in a PDCCH region of a serving subframe. In other embodiments, the indications in step 620 and 630 may include communicating an appropriate bitmap or field value in the PDCCH region of a serving subframe. In yet other embodiments, the indications in step 620 and 630 may include communicating an appropriate bitmap or field value via higher layer signaling (e.g., RRC signaling). When the subframe is a normal subframe, the bitmap or field value may specify an actual CRS antenna port and CRS frequency shift used by the neighboring cell. However, when the subframe is an MBSFN subframe, the bitmap or field value may specify that a number of CRS antenna ports equal to zero is associated with the neighboring cell. A UE may determine that CRS symbols associated with a neighboring cell are excluded from the PDSCH region of the subframe when the bitmap or field value indicates that a CRS antenna port zero is associated with the neighboring cell.

Figure 7:
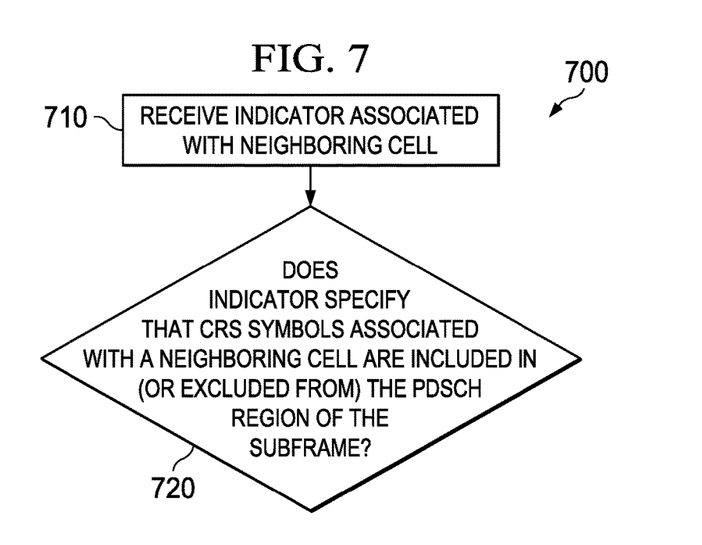
FIG. 7 illustrates a flow chart of a method for determining whether CRS symbols are present in the PDSCH region of a subframe communicated by a neighboring cell.

FIG. 7 illustrates a method 700 for determining when CRS symbols are present in a PDSCH region of subframes carrying data transmission of neighboring cells, as might be performed by a served UE. The method 700 begins at step 710, where the served UE receives an indicator associated with a neighboring cell from a serving eNB. Thereafter the method 700 proceeds to step 720, where the served UE determines, based on the indicator, whether CRS symbols associated with a neighboring cell are excluded from the PDSCH region of the subframe.

The location of CRS symbols is timing-varying, and depends on the configuration of MBSFN subframes in LTE. Different cells can have independent configurations of MBSFN subframes. The UE knows whether CRS symbols transmitted by the serving cell are present in (or absent from) a given subframe because the UE knows the transmission time interval (TTI) of the serving cell. However, served UEs do not generally know the TTI structure of neighboring cells, and therefore may be unable to determine when CRS symbols transmitted by neighboring cells are present in (or absent from) a given subframe. Various embodiments of this disclosure provide optimized methods for signaling the time-varying nature of the CRS of one or more neighbor cells, targeting cooperating and non-cooperating interference management techniques.

In an embodiment, the UE is informed about the time-varying properties of the presence of CRS symbols of a neighbor cell by an indicator signaled by the serving cell. The indicator may be signaled by physical layer signaling/channel, high layer signaling/channel, or a combination thereof. Notably, cooperative and non-cooperative interference mitigation techniques may be performed to increase the performance of the wireless network. For instance, cooperative techniques (e.g., CoMP JT, CoMP DCS, eICIC PDSCH muting, etc.) may be implemented at the transmitter side to increase the performance of the wireless network. Additionally, non-cooperative techniques (e.g., receiver-based interference cancellation, etc.) may also be used to increase the performance of the wireless network. Various embodiments provide specific signaling relative to CoMP joint transmission and dynamic point selection, eICIC PDSCH muting, and eICIC receiver-based interference cancellation.

In an embodiment, a UE can benefit from the knowledge of the location of cell-specific reference signals (CRS) of a neighbor cell in order to adjust serving cell's or UE's transmission/reception parameters and/or operations in an effort to improve channel capacity during periods in which strong interference is experienced from the neighbor cell. The terms cell, point, and transmission point (TP) may be used interchangeably herein to refer to a transmitter with a set of co-located transmit antennas. The cells or points may be a macro-cell with high transmit power, or low power node such as pico-cell, femto-cell, relay node, or remote radio head/unit (RRH/RRU).

One example of coordinated transmission includes CoMP JT, where a number of cells (e.g., N cells) jointly precode the same data symbol sent to the UE on any resource element where none of the N cells transmit CRS symbols. If at least one of the N cells sends a CRS symbol on a resource element, then joint transmission using the associated transmission scheme or precoding may not take place on the resource element. The UE may not demodulate the PDSCH on this resource element using the same precoding information or demodulation reference signal (or pilot or UE-specific RS) as on the other resource elements. Therefore, the UE should be aware of the existence and location of the CRS of all the N cells. A further optimization includes transmitting the PDSCH from a single one of the N cells on resource elements that collide with any CRS symbols of the N cells.

In the downlink (DL) direction, where the eNB transmits to the UE, DL coordinated multi-point transmission may include coordination among multiple geographically separated transmission points. An example of DL coordinated transmission schemes include coordinated beamforming, where transmissions to a UE originate from one of the transmission points and scheduling decisions are coordinated to control parameters of the communication, e.g., interference generated in a set of coordinated cells, etc.

Another example of coordinated transmission includes joint processing, which uses the principles of joint transmission and dynamic cell selection to provide advanced interference mitigation capabilities. Joint transmission involves simultaneous transmissions to a single UE from multiple transmission points, which may coherently or incoherently improve the received signal quality and/or actively cancel interference from other UEs. Dynamic cell selection involves transmissions from one source point at a time within the CoMP cooperating set, which is a set of one or more cells participating in CoMP operation with a UE.

DL coordinated multi-point transmission includes the possibility of coordination between different cells. From a radio-interface perspective, there may be no difference from the UE perspective if the cells belong to the same eNB or different eNBs. If inter-eNB coordination is supported, information needs to be signaled between eNBs, such as via an inter-eNB interface (e.g., an X2 interface).

Multi-User (MU) Multiple Input, Multiple Output (MIMO) is a technique in which transmissions to multiple receivers that share the same network resources (e.g., time domain and/or frequency domain network resources) are differentiated in the spatial domain. A control channel is normally used to schedule MU-MIMO transmissions. Receivers participating in MU-MIMO may be referred to herein as a UE pair or a UE group.

A heterogeneous network (HETNET) may be described as a communications system made up of full power cells, such as macro cells, typically deployed as a planned network by a service provider, and low power nodes (LPN), such as pico cells, femto cells, and so forth, that may be deployed by a service provider and/or a subscriber to help improve performance in high subscriber density areas or low coverage areas.

Figure 8:
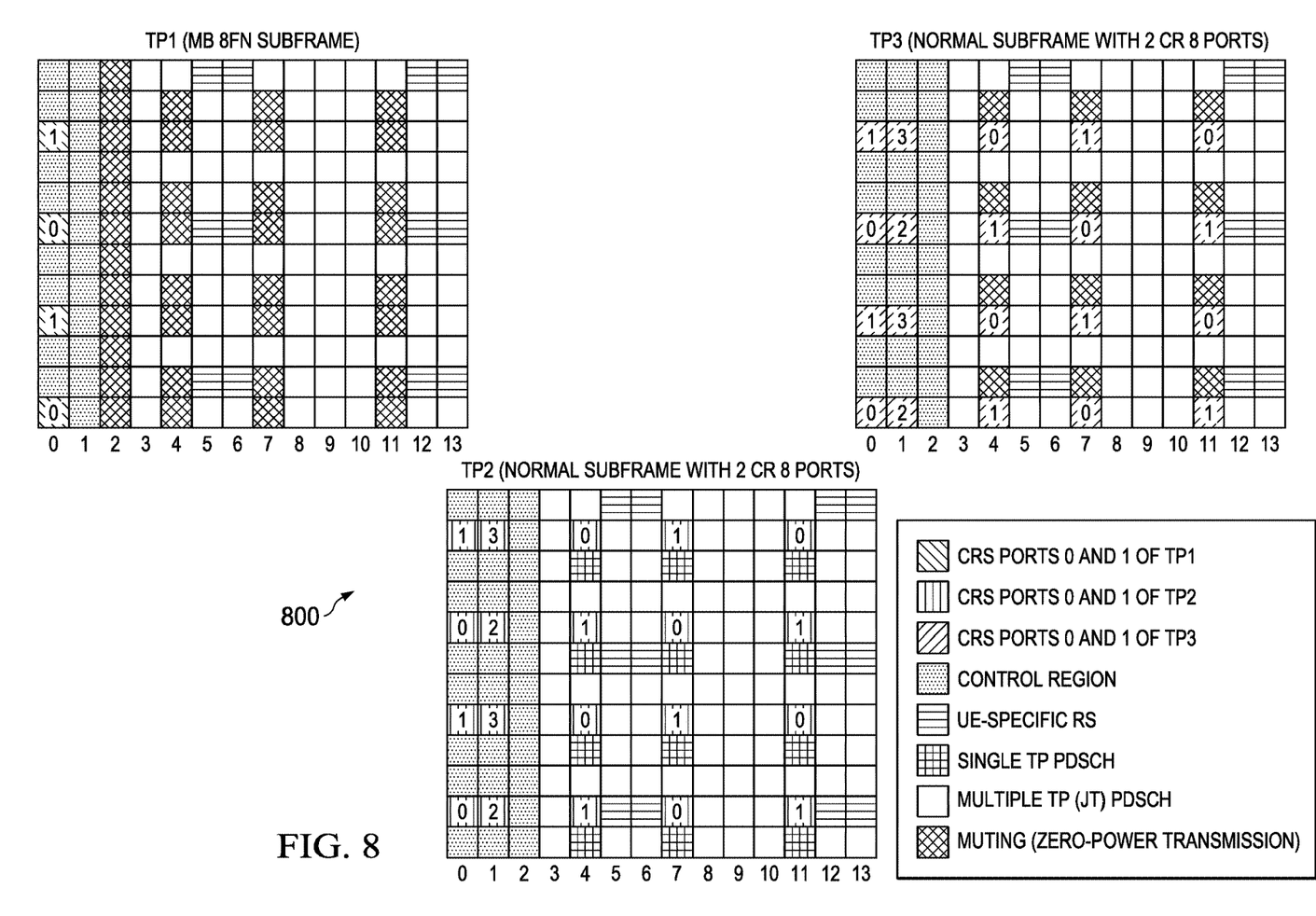
FIG. 8 illustrates a diagram of an example of physical downlink shared channel (PDSCH) mapping for a joint transmission from three transmit points.

FIG. 8 illustrates an example of PDSCH mapping for JT from 3 cells when the UE knows the number of CRS ports, MBSFN subframe configurations, control region sizes, and the CRS shifts. The horizontal axis represents OFDM symbols, and the vertical axis represents subcarriers. One resource block is shown for each TP. In this example of PDSCH mapping for JT, three cells are assumed to participate in the joint transmission (TP1, TP2, TP3), and all subframes are assumed to be configured with the same cyclic prefix length. In this case, TP1 is in MBSFN subframe, while TP2 and TP3 are in normal subframe with 2 CRS ports each and a frequency shift is applied. TP2 is assumed to transmit in REs that collide with CRS.

For downstream transmission in the serving cell, a served UE may determine that whether the subframe is a normal or MBSFN subframe, the number of CRS ports used to transmit the subframe, and a CRS frequency shift applied to the subframe based on a subframe index communicated in the PDCCH portion of the subframe. The PDSCH region is partitioned into two regions. In the first region, the jointly precoded PDSCH is demodulated based on UE-specific RS. In the second region, the PDSCH is demodulated based on the CRS of one of the three cells participating in the joint transmission. In this case, TP2 is selected as the point transmitting with single-point transmission in the second region due to its higher SNR than TP3, and since TP1 has no CRS in this subframe.

In terms of CoMP DCS and CoMP DPS, one out of N cells is selected to transmit the PDSCH to a UE on a specific subframe. The selected cell can be changed dynamically from subframe to subframe. The PDSCH can only be sent on resource elements where the selected cell does not transmit CRS. Typically, the UE is only aware of the location of the CRS of its serving cell from which it receives the PDCCH that assigns the PDSCH transmission. The UE may generally not attempt to decode the PDSCH on resource elements that carry the CRS of the cell selected for PDSCH transmission.

In reference to eICIC, a macrocell may create very strong interference to a UE associated with a picocell located in the coverage of the macrocell when range extension is applied to that UE, since the power received from the macro base station is larger than the power received from the pico base station. Typically, the macrocell would either not transmit data or schedule data with low transmit power on specific subframes reserved to protect the pico UEs (PUEs) in range extension. However, the macrocell may not turn off the CRS when CRS symbols are expected to be present in the macro subframe, since CRS symbols are used for long-term channel measurements. Solutions to avoid or remove the interference caused by macro CRS on the PUE's PDSCH include the following two types.

In an embodiment of eICIC transmitter-based PDSCH muting, the picocell can mute data transmission on resource elements that collide with macro CRS based on the location of macro CRS symbols. In some embodiments, the PUE does not expect to receive PDSCH on those muted resource elements. This kind of PDSCH transmission may be referred to as PDSCH muting.

In an embodiment of eICIC receiver-based interference cancellation, the PUE attempts to estimate the macro CRS, then subtract them from the signal received on resource elements that collide with the macro CRS, then detects its own PDSCH on these resource elements. The PUE may also set the soft demodulation information (i.e., Log-likelihood ratio (LLR) information) on resource elements that collide with macro CRS equal to a fixed value (e.g., 0 dB), then detects its own PDSCH. This kind of PDSCH detection can be referred to as PDSCH discarding.

The UE is signaled the MBSFN subframe configuration of the neighbor cells, the subframe offset of the neighbor cells relative to the subframe timing of the serving cell. The UE should also be notified of the number of CRS ports and the CRS frequency shift for each of the neighbor cells, so that the UE can derive whether a given subframe is a normal subframe or an MBSFN subframe. Alternatively, the UE may be directly notified of a muting on/off pattern for each neighbor cell. For example, the muting pattern may include a bitmap (e.g., 40 bits in length) corresponding to a group of consecutive TTIs (e.g., 40 TTIs). In some embodiments, each bit of the bitmap may indicate whether CRS symbols of neighbor cells are present in the corresponding TTI. The number of CRS ports and CRS shift may be signaled separately.

Alternatively, a muting pattern for each neighbor cell may be directly signaled to the served UE. For instance, the signaling may include a bitmap having a length of N*40 bits (which corresponds to a consecutive time of 40 TTIs), where each group of N bits represents one of the neighboring cells. In such embodiments, a bit may indicate to the UE whether the CRS symbol of the neighboring cell is present, as well as the number of CRS ports and CRS frequency shift (e.g., in a manner consistent with the shown in Table 1).

For transmission-based interference avoidance with PDSCH muting, the UE skips detection of PDSCH on the identified resource elements when the scheduled PDSCH corresponds to a normal subframe. For receiver-based interference cancellation, the UE performs interference cancellation on the identified resource elements when the scheduled PDSCH corresponds to a normal subframe.

In one embodiment, the transmission parameters in any subframe depend on a single neighbor cell, and are signaled through physical layer signaling. These parameters may include the number of CRS ports and the CRS frequency shift of the neighbor cell. If CRS symbols are absent from a region of the subframe (e.g., the PDSCH region), then the signaling may indicate zero CRS ports. For example, the signaling may indicate zero CRS ports by including a field value having all zeros, as shown in Table 1. In some embodiments, the signaling may be associated with different neighbor cells for different subframes, and the association may change in a dynamic fashion. Signaling of subframe offset relative to the serving cell may not be needed when the signaling association changes dynamically. This type of signaling may be extended to an arbitrary number of neighbor cells.

TABLE 1

| Field value | Frequency shift of CRS | Number of CRS ports |
|---|---|---|
| 0000 | Not applicable | 0 |
| 0001 | 0 | 1 |
| 0010 | 1 | 1 |
| 0011 | 2 | 1 |
| 0100 | 3 | 1 |
| 0101 | 4 | 1 |
| 0110 | 5 | 1 |
| 0111 | 0 | 2 |
| 1000 | 1 | 2 |
| 1001 | 2 | 2 |
| 1010 | 0 | 4 |
| 1011 | 1 | 4 |
| 1100 | 2 | 4 |
| Reserved | Reserved | Reserved |
| Reserved | Reserved | Reserved |
| Reserved | Reserved | Reserved |

In another embodiment, the number of CRS ports and the CRS frequency shift for each of the neighbor cells is achieved via high layer signaling (e.g., RRC signaling), and a single-bit indicator informing the UE whether CRS of the neighbor cell are present (normal subframe) or absent (MBSFN subframe) in the PDSCH region of the subframe is communicated via physical layer signaling/channel.

In yet another embodiment, the transmission parameters of a subframe depend on a sub-set of neighbor cells dynamically selected from a larger set of neighboring cells, and a combination of high layer signaling and physical layer signaling provides a good compromise between signaling overhead and capacity improvement, as may be the case for CoMP JT and DCS. A UE is indicated using the following parameters for each cell in set B by high layer signaling/channel: the MBSFN subframe configuration, the subframe offset relative to the subframe timing of the serving cell. The UE may also be informed of the number of CRS ports and the CRS frequency shift for each cell in the set B. Then the UE is informed which cells of set B are included in the sub-set (set A) via physical layer signaling/channel. The UE can then derive whether the subframe corresponds to a normal subframe or an MBSFN subframe of cells in set A, and adjust the transmission parameters accordingly, depending on pre-defined rules applied at the eNB.

Figure 9:
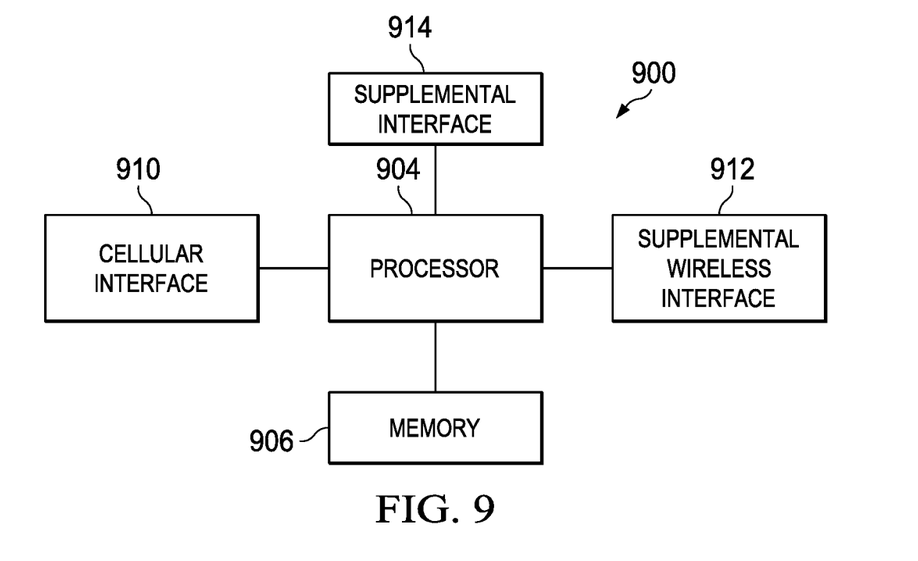
FIG. 9 illustrates a block diagram of an embodiment of a communications device.

FIG. 9 illustrates a block diagram of an embodiment of a communications device 900, which may be equivalent to one or more devices (e.g., UEs, eNBs, etc.) discussed above. The communications device 900 may include a processor 904, a memory 906, a cellular interface 910, a supplemental wireless interface 912, and a supplemental interface 914, which may (or may not) be arranged as shown in FIG. 9. The processor 904 may be any component capable of performing computations and/or other processing related tasks, and the memory 906 may be any component capable of storing programming and/or instructions for the processor 904. The cellular interface 910 may be any component or collection of components that allows the communications device 900 to communicate using a cellular signal, and may be used to receive and/or transmit information over a cellular connection of a cellular network. The supplemental wireless interface 912 may be any component or collection of components that allows the communications device 900 to communicate via a non-cellular wireless protocol, such as a Wi-Fi or Bluetooth protocol, or a control protocol. The supplemental interface 914 may be any component or collection of components that allows the communications device 900 to communicate via a supplemental protocol, including wireline protocols. In embodiments, the supplemental interface 914 may allow the device 900 to communicate with a backhaul network.

Figure 10:
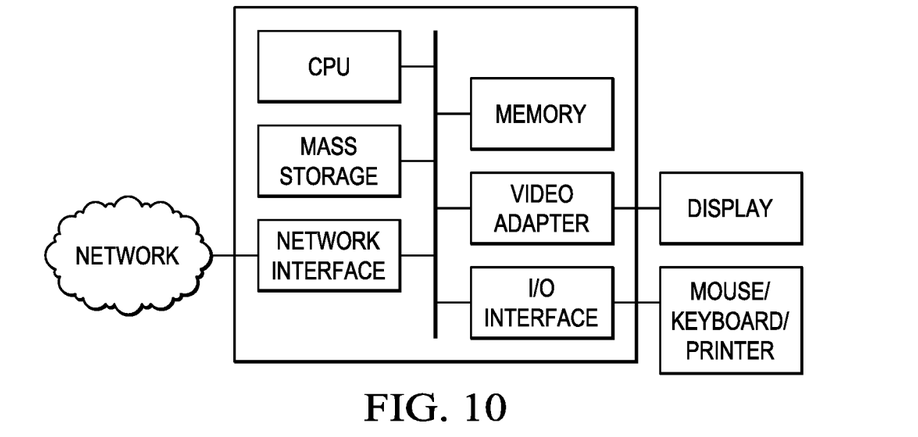
FIG. 10 illustrates a block diagram of an embodiment of a processing system.

FIG. 10 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

U.S. patent application Ser. No. 13/099,315, entitled "System and Method for Mapping Data Symbols," filed on May 2, 2011, discloses systems and methods for resource element utilization for CoMP, which application is hereby incorporated herein by reference. This application provides examples of systems and methods that may be utilized in embodiments disclosed herein.

One or more of the following references may relate to this disclosure, and each of these references are incorporated herein by reference as of reproduced in their entirety. Third Generation Partnership (3GPP) publication R1-112895 entitled "TX-based solution for further evaluation," submitted by Huawei and HiSilicon in October-2011; 3GPP publication R1-113272 entitled "Considerations on PBCH and PSS/SSS for FeICIC," submitted by LG Electronics in October-2011; 3GPP publication R1-104818 entitled "Enabling communication in harsh interference scenarios" submitted by Qualcomm Incorporated in October-2010; 3GPP publication R1-105442 entitled "Views on eICIC Schemes for Rel-10" submitted by NTT DOCOMO in October-2010; and 3GPP publication R1-113244 entitled "Transmit-side Signaling Enhancements Targeting Het-Nets for Rel-11," submitted by Texas Instruments in October-2011.

While much of this disclosure is discussed within the context of Third Generation Partnership Project (3GPP) Long Term Evolution (LTE) networks (Advanced or otherwise), aspects of this disclosure are not so limited. For instance, one or more of the aspects of this disclosure may be applicable to Worldwide Interoperability for Microwave Access (WiMAX) or other networks.

While aspects of this disclosure have been described with reference to certain embodiments, this description is not intended to be construed in a limiting sense. Various modifications and combinations of the herein described embodiments, as well as other embodiments of this disclosure, will be apparent to persons skilled in the art upon reference to the description. It is therefore intended that the appended claims encompass any such modifications or embodiments.

What is claimed is:

1. A method for operating a user equipment (UE), the method comprising:
   receiving, by the UE, at least one indicator from a first network controller, the at least one indicator specifying at least one parameter associated with cell-specific reference signal (CRS) symbols transmitted by a second network controller; and
   receiving, by the UE, a physical downlink shared channel (PDSCH) from the first network controller, the UE assuming that resource elements corresponding to the CRS symbols transmitting by the second network controller are not available for carrying the PDSCH received from the first network controller.

2. The method of claim 1, wherein the at least one indicator received from the first network controller specifies a CRS port count associated with the CRS symbols transmitted by the second network controller.

3. The method of claim 2, wherein the CRS port count consists of one long term evolution (LTE) antenna port associated with the CRS symbols transmitted by the second network controller.

4. The method of claim 2, wherein the CRS port count consists of two long term evolution (LTE) antenna ports associated with the CRS symbols transmitted by the second network controller.

5. The method of claim 2, wherein the CRS port count consists of four long term evolution (LTE) antenna ports associated with the CRS symbols transmitted by the second network controller.

6. The method of claim 1, wherein the at least one indicator received from the first network controller specifies both a CRS port count associated with the CRS symbols transmitted by the second network controller and a CRS frequency shift of the CRS symbols transmitted by the second network controller.

7. The method of claim 6, wherein the CRS port count consists of one, two, or four long term evolution (LTE) antenna ports associated with the CRS symbols transmitted by the second network controller.

8. The method of claim 1, wherein the method further comprises:
   receiving a subframe carrying a data destined for the UE, wherein the data is transmitted in accordance with a coordinated multipoint (CoMP) transmission technique such that the data is transmitted by both the first network controller and the second network controller transmitted by the second network controller.

9. The method of claim 1, wherein the method further comprises:
   receiving a subframe;
   determining that the CRS symbols of the second network controller are present in the physical downlink shared channel (PDSCH) region of the subframe in accordance with the at least one indicator;
   mitigating interference in the PDSCH region of the subframe attributable to the CRS symbols of the second network controller; and
   demodulating serving data carried in the PDSCH region of the subframe.

10. A user equipment (UE) comprising:
    a processor; and
    a computer readable storage medium storing programming for execution by the processor, the programming including instructions to:
    receive at least one indicator from a first network controller, the at least one indicator specifying at least one parameter associated with cell-specific reference signal (CRS) symbols transmitted by a second network controller; and
    receive a physical downlink shared channel (PDSCH) from the first network controller, the UE assuming that resource elements corresponding to the CRS symbols transmitting by the second network controller are not available for carrying the PDSCH received from the first network controller.

11. The UE of claim 10, wherein the at least one indicator received from the first network controller specifies a CRS port count associated with the CRS symbols transmitted by the second network controller.

12. The UE of claim 11, wherein the CRS port count consists of one long term evolution (LTE) antenna port associated with the CRS symbols transmitted by the second network controller.

13. The UE of claim 11, wherein the CRS port count consists of two long term evolution (LTE) antenna ports associated with the CRS symbols transmitted by the second network controller.

14. The UE of claim 11, wherein the CRS port count consists of four long term evolution (LTE) antenna ports associated with the CRS symbols transmitted by the second network controller.

15. The UE of claim 10, wherein the at least one indicator received from the first network controller specifies both a CRS port count associated with the CRS symbols transmitted by the second network controller and a CRS frequency shift of the CRS symbols transmitted by the second network controller.

16. The UE of claim 15, wherein the CRS port count consists of one, two, or four long term evolution (LTE)

antenna ports associated with the CRS symbols transmitted by the second network controller.

17. The UE of claim 10, wherein the programming further includes instructions to:
- receive a subframe carrying a data destined for the UE, wherein the data is transmitted in accordance with a coordinated multipoint (CoMP) transmission technique such that the data is transmitted by both the first network controller and the second network controller transmitted by the second network controller.

18. The UE of claim 10, wherein the programming further includes instructions to:
- receive a subframe;
- determine that the CRS symbols of the second network controller are present in the physical downlink shared channel (PDSCH) region of the subframe in accordance with the at least one indicator;
- mitigate interference in the PDSCH region of the subframe attributable to the CRS symbols of the second network controller; and
- demodulate serving data carried in the PDSCH region of the subframe.

* * * * *